US007549600B2

(12) United States Patent
Hesse et al.

(10) Patent No.: US 7,549,600 B2
(45) Date of Patent: Jun. 23, 2009

(54) APPARATUS AND METHOD FOR THE LOW-CONTAMINATION, AUTOMATIC CRUSHING OF SILICON FRAGMENTS

(75) Inventors: Karl Hesse, Burghausen (DE); Franz Schreieder, Tann (DE)

(73) Assignee: Wacker-Chemie GmbH, Munich (DE)

( * ) Notice: Subject to any disclaimer, the term of this patent is extended or adjusted under 35 U.S.C. 154(b) by 743 days.

(21) Appl. No.: 11/238,854

(22) Filed: Sep. 29, 2005

(65) Prior Publication Data
US 2006/0088970 A1 Apr. 27, 2006

(30) Foreign Application Priority Data
Oct. 7, 2004 (DE) ................. 10 2004 048 948

(51) Int. Cl.
*B02C 17/02* (2006.01)
(52) U.S. Cl. ........................ 241/24.1; 241/29
(58) Field of Classification Search ............... 241/24.1, 241/29, 264
See application file for complete search history.

(56) References Cited

U.S. PATENT DOCUMENTS

| | | | |
|---|---|---|---|
| 4,871,117 A | 10/1989 | Baueregger et al. | |
| 5,346,141 A | 9/1994 | Kim et al. | |
| 5,464,159 A | 11/1995 | Wolf et al. | |
| 5,496,416 A * | 3/1996 | Hall et al. | 136/258 |
| 5,660,335 A | 8/1997 | Köppl et al. | |
| 6,024,306 A | 2/2000 | Koppl et al. | |
| 6,375,011 B1 | 4/2002 | Flottmann et al. | |

FOREIGN PATENT DOCUMENTS

| | | |
|---|---|---|
| DE | 241551 A1 | 12/1986 |
| DE | 4316626 A1 | 11/1994 |
| DE | 19842078 A1 * | 3/2000 |
| DE | 19948395 A1 | 5/2001 |
| EP | 1338682 A2 | 8/2003 |
| GB | 2025260 A | 1/1980 |
| JP | 57-067019 | 4/1982 |
| JP | 58-145611 | 8/1983 |
| JP | 02-152554 | 6/1990 |
| JP | 2004-161595 | 6/2004 |
| JP | 2004161595 A | 6/2004 |

OTHER PUBLICATIONS

Kellerwessel et al. "Aufbereitung Disperser Feststoffe" [Conditioning of disperse solids], VDI Verlag, pp. 32-37.
Derwent abstract corresponding to DD 241 557 A1. (Enc.) (European S.R.).
US 5,660,335 A1 is corresponding to DE 43 16 626 A1.
EPO-abstract corresponding to JP 57-067019.
EPO.abstract corresponding to JP 02-152554.
EPO-abstract corresponding to JP 58-145611.
Patent Abstract of Japan corresponding to JP 2004161595 A.
Derwent abstract concerning DE 199 48 595 A1.
Karl Höffl "Zerkleinerungs- und Klassiermaschinen" (Communications and classification machines), Springerverlag, pp. 49-51 and pp. 97-99.

* cited by examiner

*Primary Examiner*—Jimmy T Nguyen
(74) *Attorney, Agent, or Firm*—Collard & Roe, P.C.

(57) ABSTRACT

A crusher for producing fine silicon fragments for semiconductor or solar applications from silicon fragments suitable for semiconductor or solar applications, comprises a plurality of crushing tools, the crushing tools having a surface made from a hard, wear-resistant material, wherein the crusher has a comminution ratio e of from 1.5 to 3.

11 Claims, 2 Drawing Sheets

Method principle

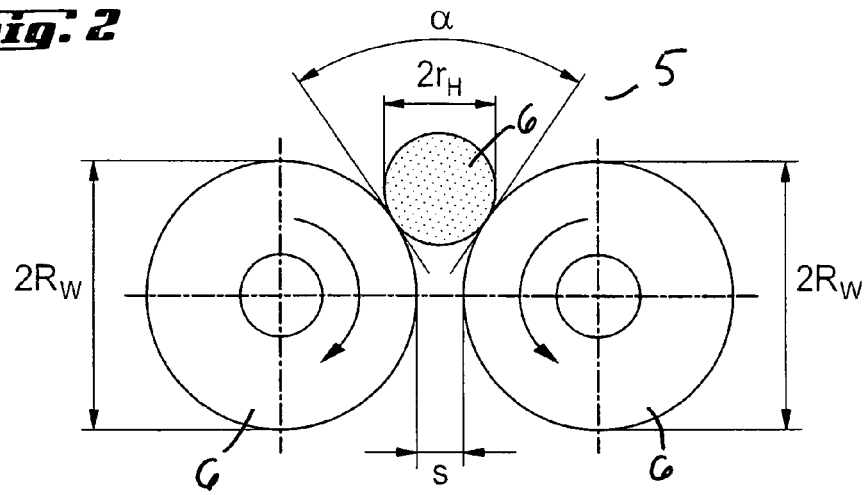
Fig. 2
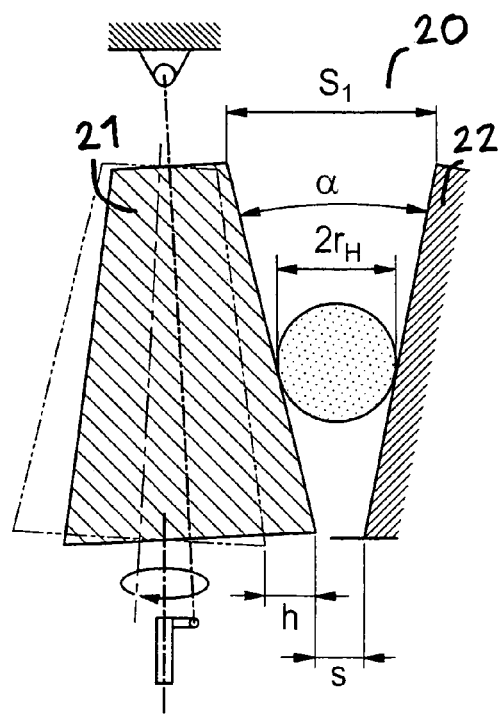
Fig. 3
Fig. 4

APPARATUS AND METHOD FOR THE LOW-CONTAMINATION, AUTOMATIC CRUSHING OF SILICON FRAGMENTS

BACKGROUND OF THE INVENTION

1. Field of the Invention

The invention relates to an apparatus and a method for the low-contamination, automatic crushing of silicon fragments.

2. The Prior Art

Polycrystalline silicon (also known as polysilicon) is the starting material for the production of crystalline silicon for the electronics and solar industries. Most semiconductor components and solar cells are produced from crystalline silicon. Various crystallization processes, in which polysilicon is usually melted and then converted into monocrystalline or multicrystalline silicon by directional solidification, are used to produce crystalline silicon. Monocrystalline material is produced, for example, by the Czochralski (CZ) process, while multicrystalline material is produced by melting and directional solidification in the crucible or by pulling sheets or casting tapes. Monocrystalline silicon is the starting material for semiconductor components and solar cells. Multicrystalline silicon is used predominantly as starting material for solar cells.

Polysilicon is usually produced by vapor deposition in a reactor. This usually involves deposition of high-purity silane or chlorosilane on a hot substrate (preferably formed from silicon), so as to obtain solid ingots, blocks or boards. Before this polysilicon can be used in crystallization processes, it has to be comminuted. During this comminution, it is usually contaminated by abraded material in such a way that the contaminants on the surface have to be removed by cleaning processes.

It has only been possible to obtain polysilicon which is suitable for use in semiconductor or solar applications directly (i.e. without further cleaning), i.e. very pure polysilicon (total metallic contamination typically <10 ppba), by manual comminution. Consequently, the production of very small fragments is insufficiently productive and therefore uneconomical and, moreover, harmful to one's health. Known automatic crushing processes which are suitable for producing small crushed fragments either cause excessive surface contamination (e.g. standard jaw crushers, roll crushers, etc.), which requires complex subsequent purification, or are uneconomical on account of very complex machine designs or complex processes (see, for example, U.S. Pat. No. 5,464,159 (shock wave comminution), or U.S. Pat. No. 6,024,306 (comminution by current pulses) or U.S. Pat. No. 4,871,117 (preliminary thermal crushing; subsequent mechanical comminution) or European Patent No. EP 1 338 682 A2).

DESCRIPTION OF THE INVENTION

It is therefore an object of the invention to provide a crusher which is suitable for producing fine silicon fragments suitable for semiconductor or solar applications from silicon fragments suitable for semiconductor or solar applications.

The object is achieved by a crusher comprising a plurality of crushing tools, in which the crushing tools have a surface made from a hard, wear-resistant material, wherein the crusher has a comminution ratio $\epsilon$ of from 1.5 to 3.

This comminution ratio is considerably lower than known comminution ratios. A comminution ratio $\epsilon$ of from 5 to 9 is usually quoted for jaw crushers, and a comminution ratio of from 3 to 6 is usually quoted for subsequent or fine crushers. (Karl Höffl, Zerkleinerungs- and Klassiermaschinen [Comminution and classification machines], Springerverlag 1986 p. 49) (Comminution ratio $\epsilon$: maximum grain size of the feed material/maximum grain size of comminuted material).

It has also been found that the crusher according to the invention can be used to produce fine silicon fragments which are suitable as seed particles for the production of granular silicon on a fluidized bed deposition operation.

The crusher according to the invention is preferably a roll crusher, a jaw crusher or a cone crusher. A roll crusher or a jaw crusher is particularly preferred.

In one embodiment of the invention, the crusher is a jaw crusher comprising a plurality of crushing tools which are arranged at a crushing angle $\alpha$ with respect to one another, wherein the crushing angle $\alpha$ is less than 14°. The crushing angle $\alpha$ is preferably less than 12°, particularly preferably 10° to 12°.

A crushing angle of 16° to 22° for coarse material and from 14° to 20° for fine material is usually quoted for jaw crushers in the specialist literature (Höffl p. 51). In the context of the present invention, the "crushing angle" or "contact angle" is to be understood as meaning the angle between the tangents on the crushing tools at the contact point of the material for comminution at the start of the crushing operation (FIG. 1). The term "crushing angle" is more customary for jaw crushers. The term "contact angle" is similarly customary for roll crushers.

In the case of a jaw crusher, the jaws preferably have a jaw length of 45 cm and an opening width of 160 mm, particularly preferably an opening width of 125 mm.

A further embodiment of the invention involves a roll crusher comprising a plurality of crushing tools which are arranged at a crushing angle $\alpha$ with respect to one another, wherein the crushing angle $\alpha$ is less than 25°, and particularly preferably less than 20°. This is preferably a smooth roll crusher or a profiled roll crusher (e.g. toothed or grooved roll crushers).

The prior art cites contact angles of from 30° to 39° for hard material and up to 50° for soft material for smooth roll crushers. (Höffl pages 97 to 98).

In the case of a roll crusher for large feed material with an edge length of up to 10 cm, the rolls preferably have a diameter of from 60 cm to 100 cm, particularly preferably from 80 cm to 100 cm. For small feed material with an edge length of approx. 1.5 mm, the rolls preferably have a diameter of 30 cm. In a particularly preferred embodiment of the roll crusher, the contact angle is less than 20° and the crushing rolls consist of single-crystal silicon with a diameter of 30 cm.

A further embodiment of the invention relates to a cone crusher, the crushing tools of which are arranged at a crushing angle $\alpha$ with respect to one another, the crushing angle $\alpha$ being less than 12°, preferably from 10° to 12°.

The crushing tools preferably have a surface of hard metal, unlike the hardened steels or hard steel grades which are customarily used, and particularly preferably have a surface of tungsten carbide in a cobalt matrix. The tungsten carbide preferably forms >80% by weight. Alternatively, it is possible for the crushing tools to have a surface of silicon.

It was surprising that large parts, such as the abovementioned rolls or crushing jaws, can be produced with such a high level of WC and that these crushers are able to withstand the mechanical loads involved in the comminution of silicon fragments.

It is preferable for a feed apparatus, for example a hopper, which is used to feed the silicon fragments to the crusher, to be connected upstream of the crusher. A classifying apparatus, preferably a screen, which classifies the crushed material, as well as collection apparatuses, for example containers which can be handled manually, such as chutes for the classified crushed material, are connected downstream of the crusher. The comminuted silicon fragments can also be collected in bags or sacks. However, the classification may also be carried out using an apparatus described in U.S. Pat. No. 6,375,011.

It is preferable for the feed apparatuses, classifying apparatuses and the collection apparatuses to have a surface of a low-abrasion, high-purity plastic, e.g. tefcel, polyamide, polyurethane, polypropylene or polyethylene (high-purity), in the regions which come into contact with silicon. Other materials could also be used. The surfaces may also be covered with high-purity silicon, e.g. in plate form.

A further object of the present invention is to provide an automatic method with a high productivity which produces fine silicon fragments from silicon fragments suitable for solar or semiconductor applications, which fine silicon fragments can be used directly, i.e. without further purification, as raw material for photovoltaics or can be used directly as raw material for semiconductor applications or which can be used as seed particles for the production of granular silicon in a fluidized bed deposition operation.

This object is achieved by a method wherein corresponding silicon fragments are fed to a crusher which is operated with a comminution ratio $\epsilon$ of from 1.5 to 3, producing a crushed material which is classified into fractions. Part of the crushed material with an edge length less than or equal to the maximum edge length of the desired fine silicon fragments (fraction 1) is collected in a collection container, and the part of the crushed material with an edge length greater than the edge length of the desired fine silicon fragments (fraction 2) likewise being collected.

It is preferable for the crushed material to be classified into two fractions. The classifying is preferably carried out by means of a screen. It is preferable for the part of the fine fragments with an edge length less than the minimum length of the desired fine silicon fragments to be sorted out of fraction 1 and collected separately (fraction 3). The sorting is preferably once again carried out by means of a screen of suitable mesh width.

It is preferable for the part of the crushed material with an edge length greater than the edge length of the desired fine silicon fragments to be fed back to a crusher with a comminution ratio $\epsilon$ of from 1.5 to 3 for this feed material, and then to be comminuted, classified in a similar way and collected. It is particularly preferable for the part of the crushed material with an edge length greater than the edge length of the desired fine silicon fragments to be once again fed to a crusher with a comminution ratio $\epsilon$ of from 1.5 to 3 for this feed material, and to be comminuted, classified in a similar way and collected.

After passing through the crusher four times in the described way, there are generally no longer any silicon fragments with an edge length greater than the edge length of the desired fine silicon fragments. In order not to increase the degree of contamination unnecessarily, in the method according to the invention it is preferable to pass through the crusher at most four times.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

FIG. 2 shows a schematic view of a roll crusher according to one embodiment of the invention; and FIG. 3 shows a schematic view of a jaw crusher according to another embodiment of the invention; and FIG. 4 shows a schematic view of a cone crusher according to another embodiment of the invention.

DETAILED DESCRIPTION OF THE PREFERRED EMBODIMENT

Figure 1:
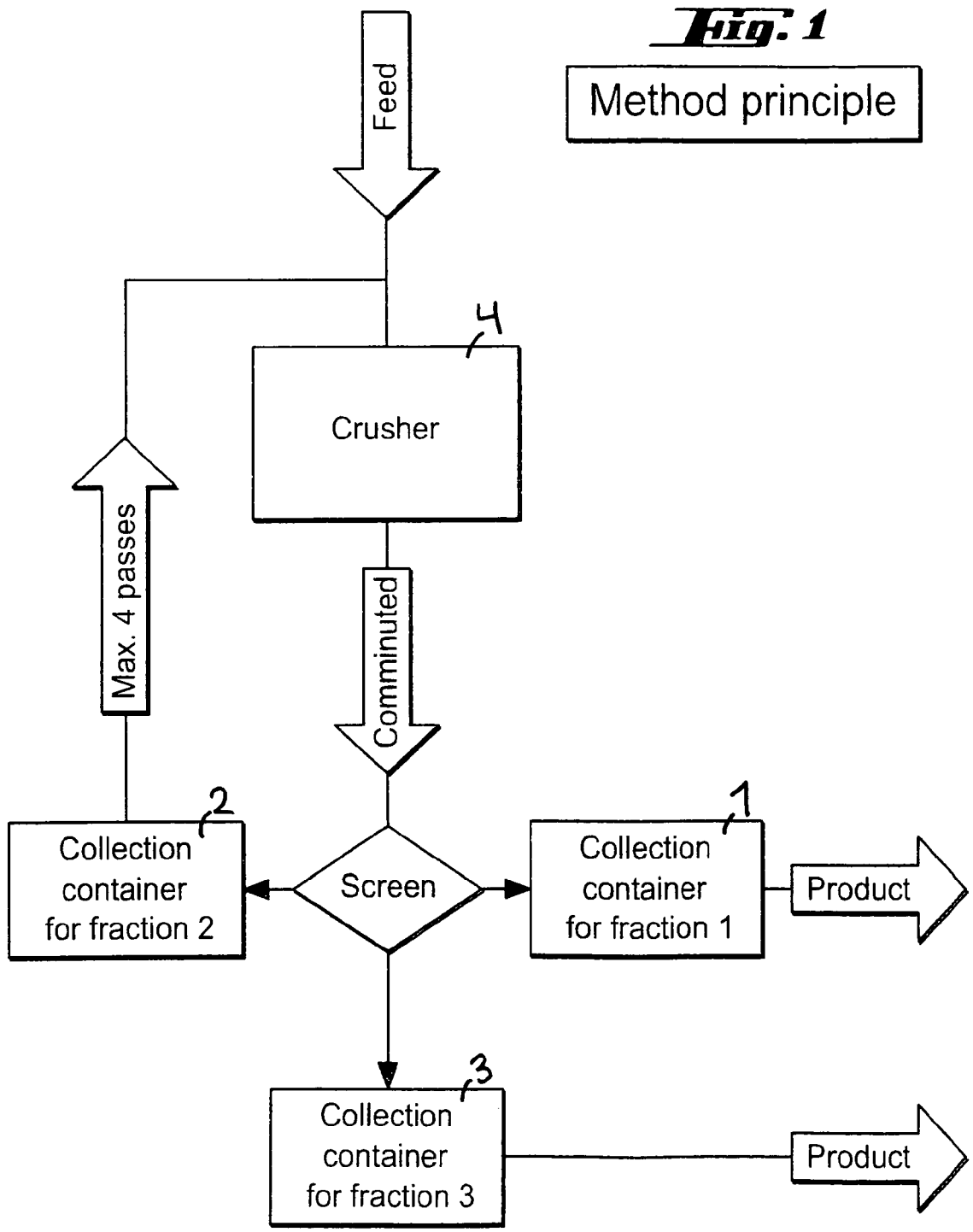
FIG. 1 illustrates the principle of the method according to the invention in a block diagram.

In one embodiment of the invention, the crushed material is classified into three fractions, part of the crushed material with an edge length in the range of the desired fine silicon fragments (fraction 1) being collected in a collection container 1, the part of the crushed material with an edge length less than the desired fine silicon fragments (fraction 3) being collected in a collection container 3 and the part of the crushed material with an edge length greater than the edge length of the desired fine silicon fragments (fraction 2) held in container 2 and being fed back to a crusher 4 according to the invention with a comminution ratio $\epsilon$ of from 1.5 to 3 for this feed material. The classification into the different fragments takes place via screen 7.

In this case, the method can be carried out in such a manner that the same crusher 4 is used each time, in which case the comminution ratio $\epsilon$ of the crusher 4 after each pass is set to the grain size of the respective feed material. However, the method can also be carried out with up to four crushers in succession.

The fractions 1 and 3 obtained after each passage through the crusher are preferably in each case combined and packaged directly, i.e. without further purification. The desired fine silicon fragments obtained in this way (fraction 1) and the fine fragments with a higher fineness (fraction 3) are suitable as fine silicon fragments for semiconductor and solar applications without further purification.

Surprisingly, it has been found that the fraction with the higher fineness (fraction 3) is eminently suitable for use as seed particles for the deposition of polycrystalline silicon in a fluidized bed process (as described for example in patent DE 19948395 A1). Therefore, the method according to the invention allows significantly more economical production of granular polysilicon, since there is no need for yield-reducing comminution of granular polysilicon to form seed particles. Moreover, there is no need for the significantly more complex, less productive comminution of granular polysilicon to form seed particles by means of a jet mill (for example as described in U.S. Pat. No. 5, 346,141).

The crushed material with an edge length in the range of the fine silicon fragments suitable for semiconductor and solar applications which are desired as product for crystallization processes preferably has an edge length of from 0.1 to 45 mm, particularly from 2 to 10 mm. The crushed material preferably has a total metallic contamination of <30 ppbw (ppbw=parts per billion in weight).

The crushed material particularly preferably has the following maximum values for the metals mentioned (details in ppbw):

Fe<20
Cu<2
Ni<2
Cr<2
Zn<4
Na<12

The silicon fragments which are fed to the crusher, if a jaw crusher is being used, preferably have a maximum particle size of 120 mm. If a roll crusher is being used, the silicon fragments preferably have a maximum particle size of 60 mm and a total metallic contamination of <10 ppba.

Even crushed material with an edge length of greater than 45 mm which remains after 4 passages through the crusher fulfills the purity demands imposed on silicon suitable for solar applications and can therefore be separated off as an independent product suitable for semiconductor and solar applications.

One advantage of the method according to the invention is that the screened target size (silicon particles with an edge length of less than 45 mm and greater than 0.1 mm) can be packaged as a product without the need for any further treatment (e.g. purification by magnetic separation or wet-chemical cleaning).

The method according to the invention allows an extremely high productivity to be achieved in the production of fine silicon fragments suitable for solar applications. It avoids high surface contamination to the fine silicon fragments which occurs with smaller crushers and crushers of different dimensions made from the same materials, as a result of different mechanical loads and therefore higher abrasion.

FIG. 2 shows a schematic view of a roll crusher 5 according to the invention. Roll crusher 5 comprises a plurality of crushing tools 6 which are arranged at a crushing angle $\alpha$ with respect to one another, wherein the crushing angle $\alpha$ is less than 25°, and particularly preferably less than 20°. This is preferably a smooth roll crusher or a profiled roll crusher (e.g. toothed or grooved roll crushers). In the case of a roll crusher for large feed material with an edge length of up to 10 cm, the rolls preferably have a diameter (i.e., 2×Rw) of from 60 cm to 100 cm, particularly preferably from 80 cm to 100 cm. For small feed material with an edge length of approx. 1.5 mm, the rolls preferably have a diameter of 30 cm. In a particularly preferred embodiment of the roll crusher, the contact angle is less than 20° and the crushing rolls consist of single-crystal silicon with a diameter of 30 cm. Roll crusher 5 has a crushing grain radius rH, which depends on the diameter of the rolls and their separation.

FIG. 3 shows a schematic view of a jaw crusher 10 according to one embodiment of the invention. Jaw crusher 10 comprises a plurality of crushing tools 11 and 12 which are arranged at a crushing angle $\alpha$ with respect to one another, wherein the crushing angle $\alpha$ is less than 14°. The crushing angle $\alpha$ is preferably less than 12°, particularly preferably 10° to 12° Jaw crusher 10 has a nip width s, a crushing displacement h, and a crushing grain radius $r_H$.

FIG. 4 shows a schematic view of a cone crusher 20 according to another embodiment of the invention. Cone crusher 20 comprises crushing tools 21 and 22. Crushing tools 21 and 22 are preferably arranged at a crushing angle $\alpha$ with respect to one another, the crushing angle $\alpha$ being less than 12°, preferably from 10° to 12°.

The following example serves to further explain the invention.

EXAMPLE 1

Smooth Roll Crusher 100 kg of lumpy silicon which had been crushed without contamination and had a particle size of from 30 mm to at most 50 mm were crushed by means of a smooth roll crusher, the roll of which consisted of over 85% W in a cobalt matrix. The manually crushed, lumpy silicon had the following initial contamination: Fe: 0.57 ppbw, W: 0.51 ppbw, Co: 0.050 ppbw (ppbw: parts per billion in weight). The proportions of the crushed material with a maximum particle size of $\leq 2$ mm were screened off by means of a nylon screen. Particles with a maximum particle size of >2 mm were fed back to the crusher. The parameters used for the roll crusher are summarized in Table 1.

TABLE 1

|  |  | 1st pass | 2nd pass | 3rd pass |
|---|---|---|---|---|
| Nip width | mm | 25 | 10 | 4 |
| Roll diameter | mm | 800 | 800 | 800 |
| max. Dimension of the feed material | mm | 45 | 27 | 12 |
| Contact angle $\alpha$ | . | 24.981 | 23.275 | 16.099 |
| Comminution ratio |  | 1.8 | 2.7 | 3 |

The contamination of the crushed material is given in ppbw in Table 2.

TABLE 2

|  | 1st Pass | 2nd Pass | 3rd Pass | Remainder <2 mm |
|---|---|---|---|---|
| Fe: | 0.93 | 1.32 | 2.84 | 10.51 |
| W: | 1.26 | 2.32 | 5.53 | 45.35 |
| Co: | 0.11 | 0.21 | 0.53 | 4.87 |

85% of the crushed material after the 3rd pass has a maximum particle size of from 1 mm to 5 mm.

10% of the crushed material after the 3rd pass has a maximum particle size of >4 mm and <12 mm.

5% of the crushed material takes the form of dust with a maximum particle size of <2 mm.

Every fraction is suitable for solar applications.

EXAMPLE 2

Production of Seed Particles Suitable for the Deposition of polycrystalline Silicon in a Fluidized Bed Process, by the Method According to the Invention 20 kg of granular polysilicon with a particle size of $\leq 1$ mm obtained by fluidized bed deposition were crushed by means of the smooth roll crusher described in Example 1. The granular polysilicon had the following initial contamination: Fe: 5.54 ppbw, W: <0.01 ppbw (below the detection limit), Co: <0.01 ppbw (below the detection limit). The proportions of the crushed material with a maximum particle size of $\leq 0.4$ mm were screened off my means of a nylon screen. Since even after the first passage through the crusher there were no longer any particles of >0.4 mm screened off, there was no need for a second pass through the crusher. The parameters used for the roll crusher are summarized in Table 3.

TABLE 3

|  |  | 1st Pass |
|---|---|---|
| Nip width | mm | 0.4 |
| Roll diameter | mm | 300 |
| Max. dimension of the feed material | mm | 1 |
| Contact angle $\alpha$ | . | 7.237 |
| Comminution ratio |  | 2.5 |

The contamination of the crushed material is given in ppbw in Table 4.

TABLE 4

|  | 1st Pass |
|---|---|
| Fe: | 6.21 |
| W: | 3.41 |
| Co: | 0.30 |

100% of the crushed material had the target size of $\leq 0.4$ mm after just one pass through the crusher. Only a very low contamination from the crushing method could be detected.

The crushed material was suitable for passing into a fluidized bed reactor (described in German patent DE 19948395 A1) without problems, where it was fluidized and heated. In the fluidized bed deposition process, it was then possible for granular polysilicon suitable for semiconductor and solar applications to be deposited on these seed particles, in virtually the same quality as the granular polysilicon used in the crushing test: Fe: 3.8 ppbw, W: 0.18 ppbw, Co: <0.01 ppbw (below the detection limit).

EXAMPLE 3

Jaw Crusher 100 kg of manually crushed, lumpy silicon with a particle size of from 65 mm to at most 120 mm were crushed by means of a jaw crusher, the crushing jaws of which consisted of over 80% W in a Co matrix. The manually crushed, lumpy silicon had the following initial contamination: Fe: 0.45 ppbw, W: 0.37 ppbw, Co: 0.034 ppbw (ppbw: parts per billion in weight).

TABLE 5

|  |  | 1st Pass | 2nd Pass |
|---|---|---|---|
| Jaw length | mm | 400 | 400 |
| Aperture angle α | · | 10 | 10 |
| Opening width | mm | 125 | 85 |
| Nip width | mm | 55.3 | 15.3 |
| Displacement at the nip | mm | 8 | 8 |
| Max. dimension of the feed material | mm | 120 | 65 |
| Max. dimension of the target product | mm | 63 | 23 |
| Comminution ratio ε |  | 1.90 | 2.83 |

100% of the material had a maximum edge length of <=23 mm after just two passes.

The contamination of the crushed material is given in ppbw in Table 6.

TABLE 6

|  | 1st Pass | 2nd Pass |
|---|---|---|
| Fe: | 1.37 | 3.23 |
| W: | 1.83 | 4.02 |
| Co: | 0.28 | 0.93 |

Accordingly, while only a few embodiments of the present invention have been shown and described, it is obvious that many changes and modifications may be made thereunto without departing from the spirit and scope of the invention.

What is claimed is:

1. An automatic method for producing fine silicon fragments for use as raw material for semiconductor applications from silicon fragments that are suitable for semiconductor applications, comprising:
passing silicon fragments that are suitable for semiconductor applications to a crusher comprising a plurality of crushing tools, wherein the crusher has a comminution ratio ε of from 1.5 to 3, to produce a crushed material;
classifying said crushed material into fractions;
collecting a first fraction of the crushed material with an edge length less than or equal to a maximum edge length of the desired fine silicon fragments in a collection container, and collecting a second fraction of the crushed material with an edge length greater than the edge length of the desired fine silicon fragments separately from said first fraction.

2. A method for producing fine silicon fragments for raw material for photovoltaics from silicon fragments that are suitable for solar applications, comprising:
feeding silicon fragments that are suitable for solar applications to a crusher comprising a plurality of crushing tools, wherein the crusher has a comminution ratio ε of from 1.5 to 3, to produce a crushed material;
classifying said crushed material into fractions, and
collecting a first fraction of the crushed material which has an edge length less than or equal to a maximum edge length of the desired silicon fragments in a collection container, and collecting a second fraction of the crushed material with an edge length greater than the edge length of the desired fine silicon fragments separately from said first fraction.

3. The method as claimed in claim 1, wherein the step of classifying is carried out by a screen.

4. The method as claimed in claim 2, further comprising the steps of sorting from said first fraction a third fraction of the fragments, said third fraction having an edge length less than a minimum length of the desired fine silicon fragments, and collecting said third fraction.

5. The method as claimed in claim 4, wherein the step of sorting into a third fraction is carried out by a screen.

6. The method as claimed in claim 1, wherein the second fraction of the crushed material with an edge length greater than the edge length of the desired silicon fragments is fed back to the crusher and is then comminuted, classified and collected.

7. The method as claimed in claim 6, wherein the second fraction of the crushed material with an edge length greater than the edge length of the desired fine silicon fragments is once again fed to the crusher and is then comminuted, classified and collected.

8. The method as claimed in claim 7, wherein at most four passes of the material through the crusher are carried out.

9. The method as claimed in claim 6, wherein the first fractions obtained after each passage through the crusher are in each case combined and packaged without further processing.

10. The method as claimed in claim 4, wherein the third fraction is used as seed particles for the deposition of polycrystalline silicon in a fluidized bed process.

11. The method as claimed in claim 6, wherein the first fraction is used as seed particles for the deposition of polycrystalline silicon in a fluidized bed process.

* * * * *